United States Patent
Golder et al.

(10) Patent No.: US 6,822,429 B2
(45) Date of Patent: Nov. 23, 2004

(54) INDUCTIVE SENSOR ARRANGEMENT COMPRISING THREE SENSE COILS COOPERATING WITH SAID THREE FIELD COILS TO FORM THREE FIELD/SENSE COIL PAIRS AND METHOD FOR DETECTING OF FERROUS METAL OBJECTS

(75) Inventors: Roger Golder, Cambridge (GB); Albert Binder, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 106 days.

(21) Appl. No.: 10/243,224

(22) Filed: Sep. 12, 2002

(65) Prior Publication Data

US 2003/0067293 A1 Apr. 10, 2003

(30) Foreign Application Priority Data

Sep. 26, 2001  (EP) ............................................ 01810939

(51) Int. Cl.[7] .............................................. G01R 19/00
(52) U.S. Cl. ......................................... 324/67; 324/329
(58) Field of Search ................................ 324/241–243, 324/66, 67, 326, 329

(56) References Cited

U.S. PATENT DOCUMENTS 2,546,771 A  * 3/1951 Mork ......................... 324/243
5,729,143 A  * 3/1998 Tavernetti et al. .......... 324/329
6,636,037 B1 * 10/2003 Ou-Yang ..................... 324/240

FOREIGN PATENT DOCUMENTS

| DE | 3733529 | * | 4/1989 |
| DE | 3619308 | * | 8/1991 |
| EP | 0366221 | * | 5/1990 |
| EP | 1092988 | * | 4/2001 |
| GE | 19648833 | * | 5/1998 |

* cited by examiner

Primary Examiner—Jay Patidar
(74) Attorney, Agent, or Firm—Sidley Austin Brown & Wood, LLP

(57) ABSTRACT

An inductive sensor arrangement for detecting ferromagnetic or non-ferrous electrically conducting objects hidden in a surrounding medium comprising three field coils arranged in essentially the same geometric plane and adjacently positioned at angular distances of usually 120° from each other around a central axis orthogonal to the plane for generating an alternating magnetic flux by a sequential excitation with an AC-current ramp. The sensor arrangement further comprises three sense coils respectively mounted inside each associated field coil and in an orientation to the axes of each of the field coils such that essentially no voltage is induced in the sensor coils in an environment free of a metallic object. When a ferromagnetic or non-ferrous electrically conducting object approaches the sensor, nine characteristic voltage value sets are produced by the three sense coils which are stored and processed by an algorithmic process for defining a distinct criterion with respect to the position of the hidden metallic object to be located. The sensor arrangement uses a single point measurement to provide an accurate position and depth discrimination of the hidden ferromagnetic or non-ferrous electrically conducting object such as a rebar (R), a copper pipe in concrete or the like.

8 Claims, 5 Drawing Sheets

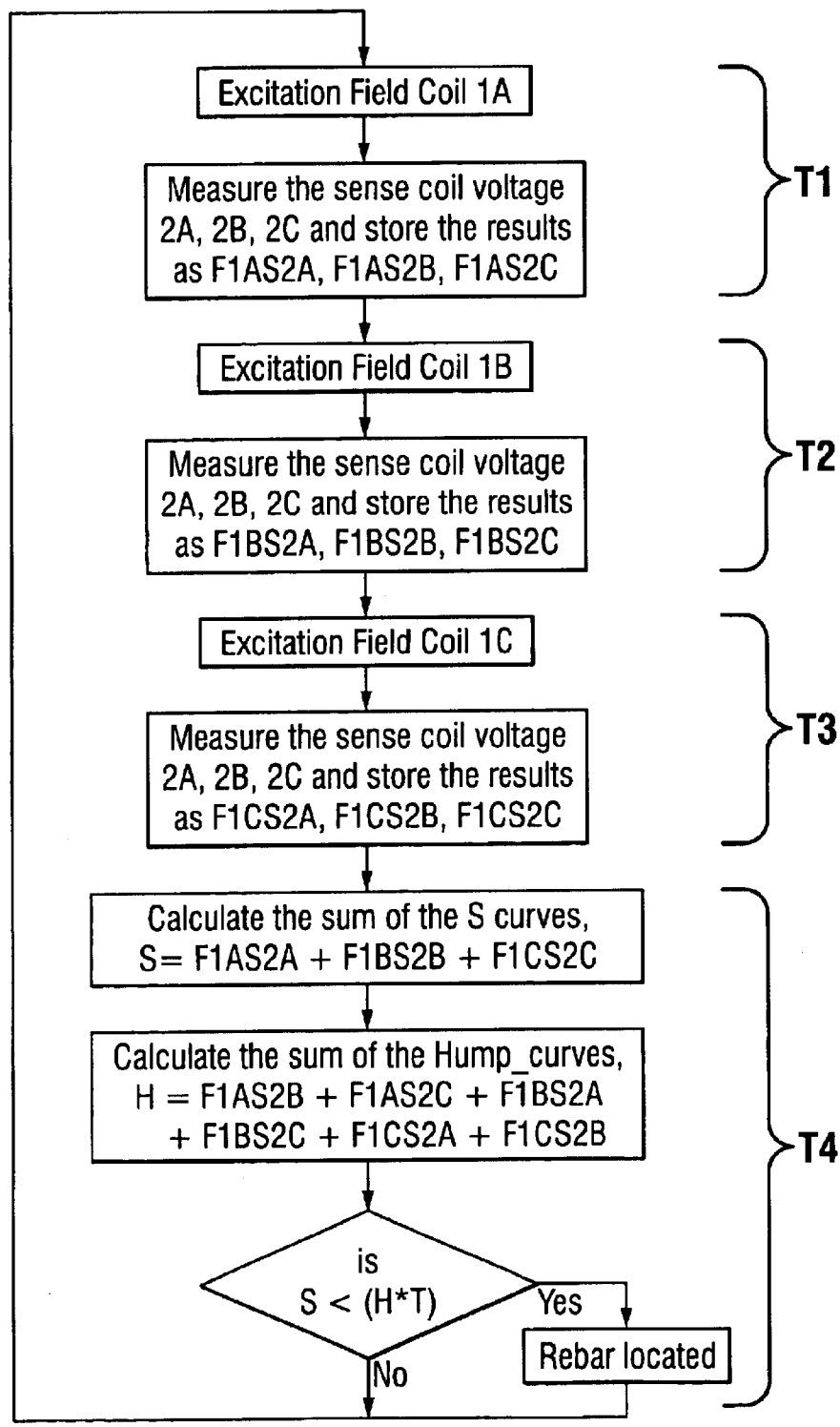

INDUCTIVE SENSOR ARRANGEMENT COMPRISING THREE SENSE COILS COOPERATING WITH SAID THREE FIELD COILS TO FORM THREE FIELD/SENSE COIL PAIRS AND METHOD FOR DETECTING OF FERROUS METAL OBJECTS

BACKGROUND OF THE INVENTION

The invention relates to an inductive sensor arrangement for detecting a ferromagnetic or non-ferrous electrically conducting object buried in a surrounding medium. The inductive sensor arrangement comprises at least one field coil for generating a penetrating alternating magnetic flux in the medium and at least one sense coil for sensing magnetic flux field disturbances caused by the ferromagnetic or non-ferrous electrically conducting object. The invention further relates to a method, and its application in a hand-held machine tool, for detecting a ferromagnetic or non-ferrous electrically conducting object hidden in a surrounding medium by use of the inventive inductive sensor arrangement.

Generally, metal detectors measure the change of a chosen parameter as an operator sweeps a sensing head across a surface of a medium wherein a disturbing piece of a metal could be hidden. The parameter may be a capacitance, an inductance or any other physical parameter that would provide a distinction of one material from another.

Specifically, detectors may be used to find reinforcing metal bars (hereinafter "rebars"), usually consisting of a ferrous material embedded in a media such as concrete, brick, plaster and the like. There are detectors on the market that can fulfill this requirement but the accurate ones must be swept across the surface of the medium, e.g. concrete. By such a "sweeping movement", it is possible to determine the position and the (length) direction of the hidden object, e.g. the rebar, from the received response signals. The metal coverage area may either be determined automatically using a rather complicated system or manually. In a manual determination, it is usual practice to manually mark the coverage and the direction of the rebar on the surface of the medium. Such manual scanning and determination requires not only time but also a specific skill and knowledge of the user or operator.

U.S. Pat. No. 5,729,143 describes a metal detector including a receive coil and a transmit coil arranged in parallel overlapping winding planes and connected in an inductive bride. Such an arrangement is a typical example of a metal detector that requires the specific skill and knowledge of the operator for interpreting the signal response.

Another type of apparatus for detecting metallic objects in a non-metallic material is described in U.S. Pat. No. 2,546,771. This detecting apparatus comprises a pair of series connected secondary coils positioned with their radii in substantially parallel planes adjacent to such material to be introduced into a detecting gap between two primary windings, respectively, diametrically encircling only one of each of the secondary coils. The primary coils are energized by an alternating current with such polarities that their magnetic fluxes are additive through such material. The secondary coils are connected in series bucking relation to produce a zero resultant output voltage across the secondary coils when the magnetic field of the primary coil is undistorted in the absence of any metallic object eventually hidden in the material probe. This known detecting apparatus, however, due to its physical dimensions and arrangement of gapped primary coils, is not suitable for detecting ferromagnetic or non-ferrous electrically conducting objects in a surrounding medium.

EP 0 366 221 AZ discloses a buried metal detection device comprising yoke-connected coils that are rotated to produce an external alternating electromagnetic field to be aligned in different directions, and monitoring variations in the energy supply drawn by the coil as an indication for the presence or non-presence of a metallic object in a surrounding medium.

EP 1 092 988 A2 discloses an inductive sensor arrangement for detecting metal objects hidden in a surrounding medium comprising a field coil pair for generating an alternating magnetic flux by a sequential excitation with an AC-current, and a pair of sense coils, respectively mounted inside each associated field coil in an orientation to the axes of each of the field coils such that essentially no voltage is induced in the sense coils in an environment free of a metallic object. If a metallic object comes into the vicinity of the inductive sensor, four characteristic voltage value sets are produced in the sense coil pair, wherein the voltage sets are processed by an algorithm for defining a position and a distinction criterion with respect to the hidden metallic object. This sensor arrangement has the advantage of a single point measurement resulting in an accurate position discrimination for a hidden metallic object like a rebar in concrete. Such an inductive sensor, however, has the limitation that reliable detection of a ferrous object like a rebar is only possible within angles of ±60° or less, usually only ±45°. To make the detector functional over a full 360° range such that arbitrary rebar angles may be detected, the EP-document also proposes that a second pair of field/sense coils is placed at 90° positions with respect to the first pair of field/sense coils to cover the orthogonal ±45° range. Such a four field/sense coil arrangement, however, if intended as an add-on rebar detection tool for a hand-held appliance such as a drill hammer, becomes dimensionally bulky and relatively expensive.

DE 196 48 833 A1 describes a device for detecting and identifying hidden objects like plastic mines in a ground. This device comprises two side-by-side arranged sensor coils that are operated at different excitation frequencies. Depending on various physical properties of the hidden object such as electrical conductivity, permeability etc. the impedance of a receiver coil arranged in an overlapping configuration of the two sensor coils is modified differently depending on the respective material properties. Again, the scanning of a specific ground area and the interpretation of the receive signals requires experience and skill.

SUMMARY OF THE INVENTION

It is an object of the present invention to provide an inductive sensor arrangement and a method for detecting ferromagnetic or non-ferrous electrically conducting objects like rebars hidden in a medium which, on the one hand, is capable of full 360° range detection and a depth determination and, on the other hand, allows a compact and small sensor design.

An inductive sensor arrangement, in accordance with the invention, comprises three field coils arranged in essentially the same geometric plane and adjacently positioned at defined angular distances from each other in relation to and around a central axis orthogonal to the plane; and three sense coils, one sense coil being respectively mounted inside each field coil in an orientation to the axis of the respectively associated field coil such that essentially no voltage is induced in the sense coil from the respectively associated field coil in an environment free of a ferromagnetic or non-ferrous electrically conducting object or material. Preferably, the three field/sense coil pairs are positioned at equal angular distances approximately 120° from each other, and the axes of the sense coils are respectively arranged orthogonally with respect to the axis of their associated field coil.

A method for detecting a ferromagnetic or non-ferrous electrically conducting object hidden in a surrounding medium by the inductive sensor arrangement, in accordance with the invention, comprises the steps of excitation of the three field coils with defined current ramps sequentially applied to each of said field coils to produce a changing magnetic flux penetrating the medium originating from three different physical positions corresponding to the field coils arrangement, collecting nine distinct output voltages from the three sense coils, i.e.

while the first field coil is excited by the defined current ramp, a first output voltage is acquired from the associated first sense coil and second and third output voltages from the remaining sense coils, respectively, while the second field coil is excited by the next defined current ramp, a fourth output voltage is acquired from the associated second sense coil and fifth and sixth voltages from the remaining first and third sense coils, respectively, while the third field coil is excited by the next following defined current ramp, a seventh output voltage is acquired from the associated third sense coil and eighth and ninth voltages from the remaining first and second sense coils, respectively, and gaining a present or non-present criterion for a ferromagnetic or non-ferrous electrically conducting object by algorithmic processing of the nine distinct output voltages.

Preferably, the algorithmic processing steps are performed sequentially with respect to a set of one voltage values for each of the nine output voltages sensed by the three sense coils during one excitation current ramp cycle supplied to each of the three field coils.

Using the sensor arrangement of the invention it becomes possible to accurately locate an electrically conducting (a metallic) or ferromagnetic object, in particular a rebar, from a single point measurement. A determination of the hidden object not only with regard to a YES/NO-answer, but also with regard to its depth in the medium below a measuring spot on the surface becomes possible with a low-cost sensor device of small spacial dimensions. The perfect functioning of the inductive sensor arrangement according to the invention is surprising insofar as the respectively oblique 120° arrangement of the field/sense coil pairs was originally believed to be impossible since the shape of the detection curves have to be similar for a correct decision, where the rebar is. The arrangement of the sensor of the invention surprisingly shows that three field/sense coil pairs have some other significant advantages over the double pair orthogonal arrangement of field/sense coil pairs of the prior art.

For the user of a hand-held tool machine like a drill hammer in the four field/sense coil pairs of the prior art, the magnetic components make a complete circle around the sensor head. Such an arrangement make it difficult to see any desired drilling marks. In the three field/sense coil pairs according to the invention, there is sufficient room to provide for features in the external molding to increase the vision.

Further, the three field/sense coil pairs arrangement needs significantly less battery power and consequently gives a longer battery operating life time. Also, the three coil pairs sensor can be manufactured considerably cheaper and the weight of the completed hand-held tool machine is lighter, which is important at the drill tip, in particular, since it reduces the time on the operator's wrist.

A further advantage of the three coil pairs arrangement, according to the present invention vis-a-vis the known four coil pairs sensors, is that a simple algorithm can be used requiring only the S-curve response signal and the hump-curve response signals which will be explained below in further detail. In contrast, in a four coil pairs arrangement opposite pairs of sense coils and their respective response signals are processed separately to cover an angular range of ±45° and the second pair of field/sense coils, i.e. the opposite sense coils, are required to cover the orthogonal ±45° range.

A sensor head and measuring unit according to the invention is simple to use, reliable and because of a one point measurement requirement also allows the operator to work in confined spaces.

BRIEF DESCRIPTION OF THE DRAWINGS

The following description relates to the function of the inductive sensor arrangement according to the invention, when a ferromagnetic object, e.g. a rebar, is sensed. If a non-ferrous electrically conducting object is sensed, e.g. aluminum, copper, etc., all signals are mirrored, respectively.

The invention and advantageous embodiments thereof will be described in further details with reference to the accompanying drawings in which:

FIG. 9 is a flow diagram of a measurement routine in accordance with the invention.

DESCRIPTION OF THE PREFERRED EMBODIMENTS

Throughout the description, the same reference signs are used for elements and parts of corresponding constructions or functions.

Figure 1:
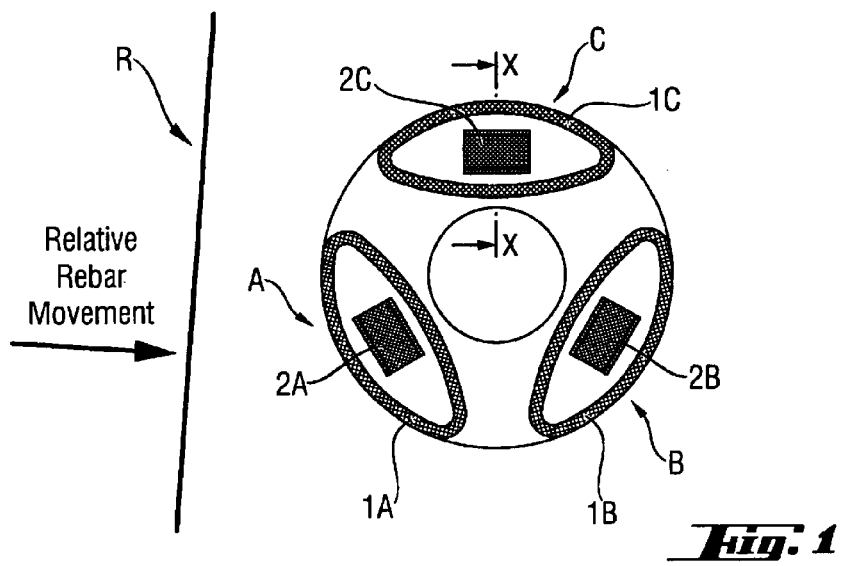
FIG. 1 shows a basic hardware configuration of an inductive sensor arrangement comprising three field/sense coils, according to the invention, with a horizontal projection view of the coil assemblies.
Figure 1A:
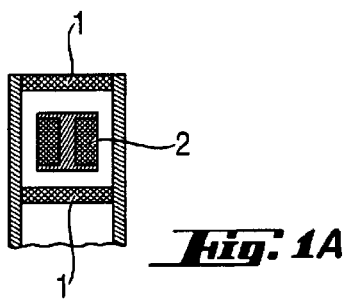
FIG. 1A shows a sectional view of one of the coil assemblies from the right, in the direction of arrows, taken along the cross section X—X of FIG. 1.

A complete inductive sensor coil assembly according to the invention is described with reference to FIG. 1. The inductive sensor coil assembly comprises three identical coil assemblies A, B and C, respectively, arranged in a predefined center distance of typically, however, in no way limiting of 30 to 70 mm. One coil assembly A, B, C consists of a field coil 1A, 1B, 1C and a sense coil 2A, 2B, 2C, respectively. In order to limit the outer dimensions of the two coil assemblies A, B, C, the cross-sectional shapes, i.e. the winding planes, of the field coils 1A, 1B, 1C may be an unsymmetrical oval as shown in FIG. 1. The field coils 1A, 1B, 1C are driven with time sequential current ramps such that a constantly changing magnetic flux is produced. Field coil 1A is driven while field coils 1B, 1C are in a passive state. Then, field coil 1B is driven while field coils 1A, 1C are in the passive state. Then, field coil 1C is driven while field coils 1A, 1B are in passive state. If present, this excites a ferromagnetic object like a rebar R with three magnetic field patterns originating from different physical positions in spite of the fact that the complete coil assembly is kept fixed in one measurement position. The sense coils 2A, 2B and 2C, respectively, are mounted inside, and as shown with respect to their axes orthogonal to the field coils 1A, 1B, 1C such that in a non-magnetic environment there is no induced voltage developed in the sense coils 2A, 2B, 2C. When a rebar R is brought or accessed in the vicinity of the coil assembly, the balance of the magnetic field is disturbed and the sense coils 2A, 2B, 2C produce characteristic outputs. For explanation purposes it is easier to visualize the voltage at the output of each of the sense coils 2A, 2B, 2C as the rebar R being traversed across the top of the complete coil assembly. The graphs of the response voltages, explained below with reference to FIG. 3 through FIG. 5, are the measured signals for passing a single rebar R over the inductive sensor assembly of FIG. 1.

It is essential to the invention that, through analysis of the measured signal responses, a unique voltage set for each finite small movement or position shift of the rebar R is received. Through superposition of the signal responses it becomes possible to predict the location of the rebar R, not only with respect to its position but also with regard to its depth, by measuring the unique voltage sets, in particular nine voltage signals, as explained further below. Also, the above explained coil configuration works for all rebar angles, i.e. 360° around measurement position.

Figure 2:
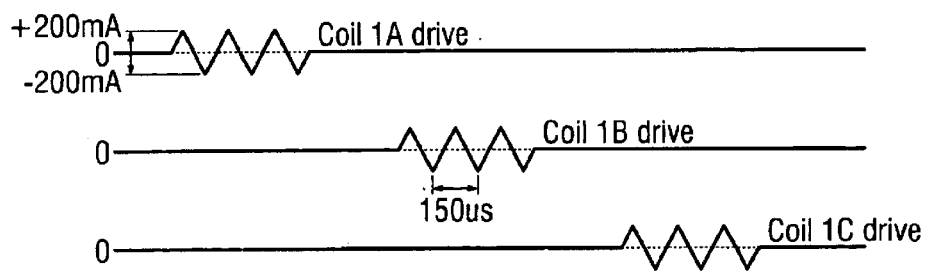
FIG. 2 shows a schematic presentation of a typical current ramp sequence for exciting the three field coils 1A, 1B and 1C of FIG. 1.
Figure 3:
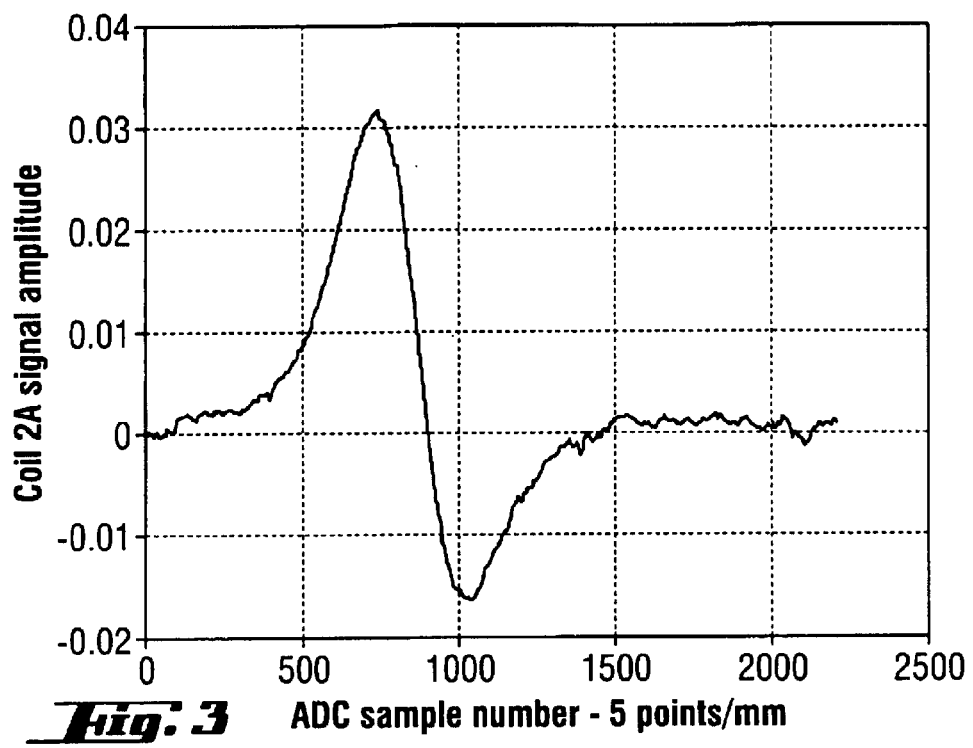
FIG. 3 shows the typical output voltage of the sense coil 2A of FIG. 1 during a current ramp excitation of the assigned field coil 1A when a ferromagnetic object, e.g., a close rebar, is sensed.
Figure 4:
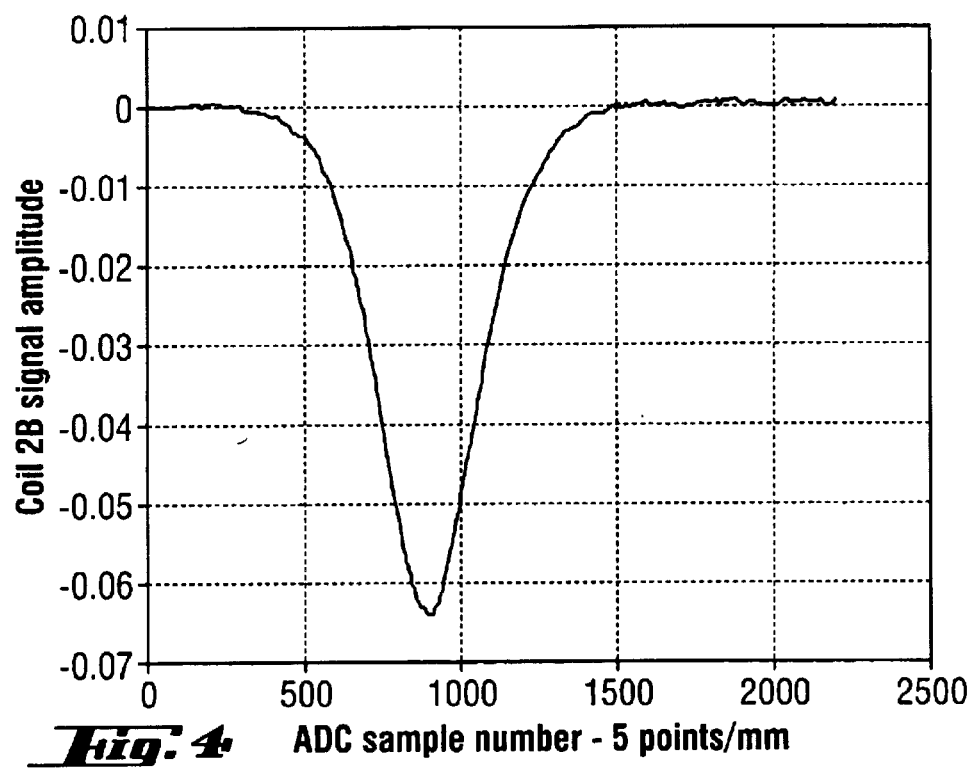
FIG. 4 shows the response at the sense coil 2B of FIG. 1 when a disturbance of the magnetic field is present due to a ferromagnetic object during a current ramp excitation of field coil 1A, e.g., if a rebar is traversed.
Figure 5:
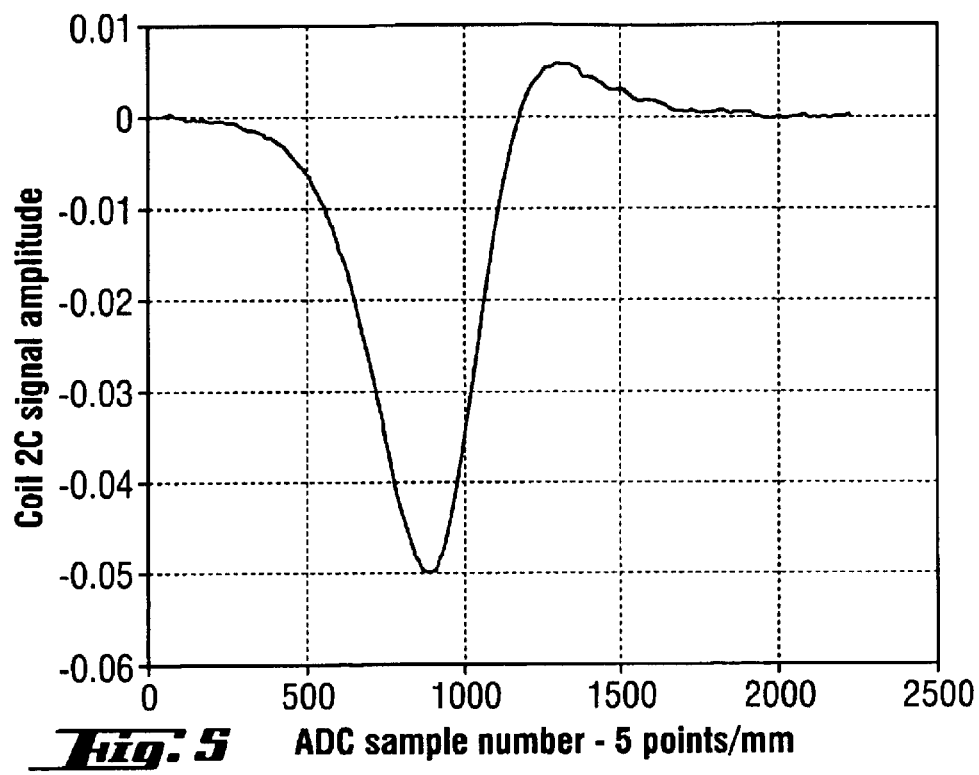
FIG. 5 shows the response at sense coil 2C of FIG. 1 when a disturbance of the magnetic field is present due to a ferromagnetic object during current ramp excitation of field coil 1A, e.g., if a rebar is traversed.

The output voltages of sense coils 2A, 2B, 2C shown in FIGS. 3, 4 and 5 are collected simultaneously as the rebar R is moved from left to right across the coil assembly of FIG. 1. The horizontal axis of the graphs represents movement of the rebar R and corresponds, but is not limited, to five measurements per 1 mm of movement. These three signal sets are obtained while field coil 1A is driven. Typically, however, but in no way limiting, with the time duration of each driving cycle and current amplitude, as shown in FIG. 2, the output voltages of the sense coils have the same characteristic shape while field coils 1B, 1C are driven. In particular, FIG. 3 shows the output voltage of sense coil 2A rising as the rebar R approaches the sense coil 2A. As the rebar R passes over the top of sense coil 2A the trace falls and goes to zero. As the rebar R moves away the voltage falls further. This characteristic curve is called the "S-curve response".

FIG. 4 and FIG. 5 show the response at the sense coils 2B and 2C, respectively, while field coil 1A is driven. These output voltages are responses to a disturbance of a magnetic field in the presence of a rebar R. As with the S-curve of FIG. 3, their amplitude is dependent upon the size and distance of the rebar R from the sensor assembly. These outputs (FIG. 4, FIG. 5) called the "HUMP-curves" (H-curves) are not useful for positional information but can be used and are used, as described below, to generate a threshold level for tracking the amplitude of the wanted S-curves.

Figure 6:
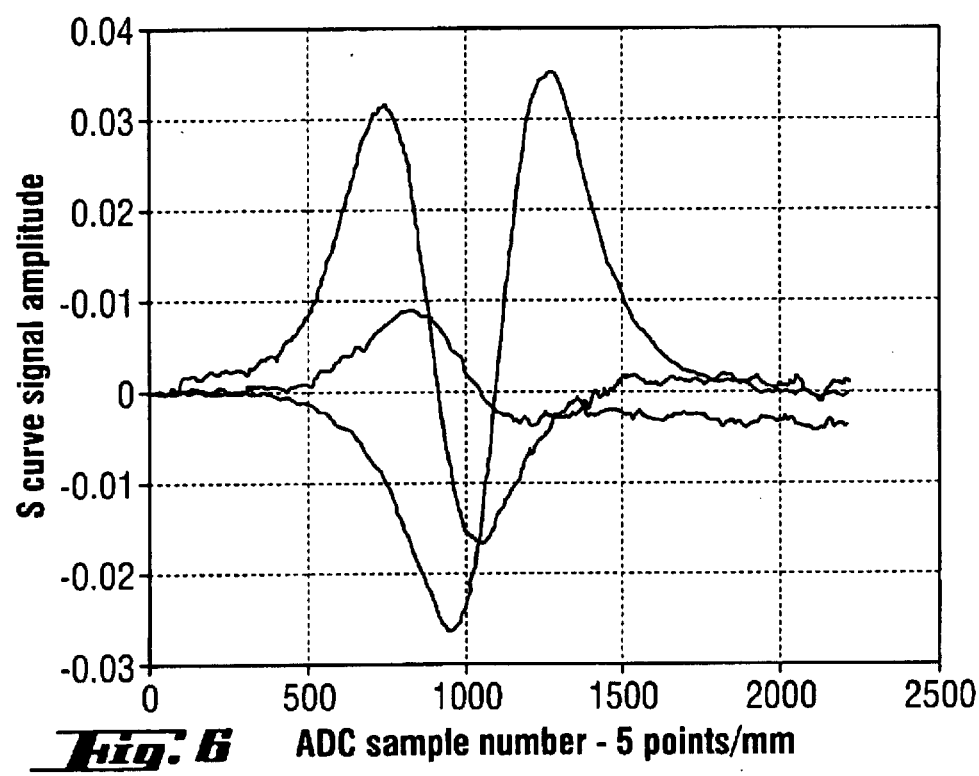
FIG. 6 shows the overlaid responses at sense coils 2A, 2B, 2C when a disturbance of the magnetic field is present due to a ferromagnetic object during current ramp excitation of field coils 1A, 1B, 1C, respectively, e.g., if a rebar is traversed.

FIG. 6 shows the S-curve responses from sense coils 2A, 2B, 2C if coil 1A, 1B, 1C is driven, respectively. The amplitude and direction of each of the three S-curves depends on the direction the rebar R approaches the coil assembly.

Figure 7:
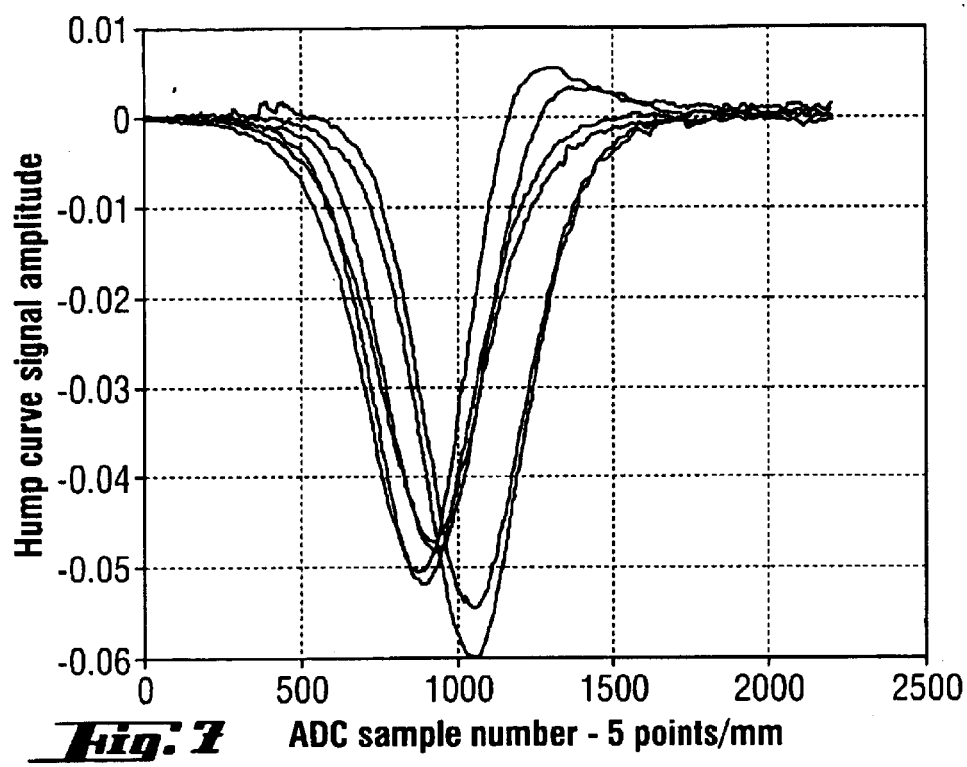
FIG. 7 shows the overlaid responses at sense coils 2A, 2B, 2C when a disturbance of the magnetic field is present due to a ferromagnetic object during current ramp excitation of filed coils 1B and 1C, 1A and 1C, 1A and 1B, respectively, e.g., if a rebar is traversed.

FIG. 7 shows the H-curve responses from the sense coils 2A, 2B, 2C while opposite field coils are driven.

Each of the three sense coils 2A, 2B, 2C give three different output signals, one corresponding to each of the field coils—that is one S-curve signal and two H-curve signals. The actual amplitudes of the three signals are dependent on the (arbitrary) rebar angle with respect to the sensor assembly.

Passing a rebar R over the three coils sensor assembly provides three S-curve signals, one from each field/sense coil pair and six H-curve signals. The only difference between the signals from A, B and C field/sense coils is a time displacement caused by the physical distance between them and the orientation of the rebar R. As the rebar R passes over the sensor assembly at any arbitrary angle the signal amplitudes and displacement vary relative to each other. Therefore, to provide less confusion to the reader, for simplicity, one plot showing the S- and H-curves is given.

Table 1 shows the relationship between the driven field coil and sense coil voltages for each type of received signal.

TABLE 1

| Field Coil driven | 1A | 1B | 1C |
| --- | --- | --- | --- |
| Sense Coil voltage 2A | S | H | H |
| 2B | H | S | H |
| 2C | H | H | S |

The signal processing consists of the sum of the three S-signals and the sum of the remaining six H-signals. The sum S represents the position of the rebar R and the sum H is a tracking threshold.

Below, with reference to the plots of FIGS. 8 and 9, a simple low-cost detection algorithm is described to indicate the detection of a ferromagnetic object, e.g., a rebar R. Other algorithms using analogue or digital signal processing techniques are feasible.

Figure 8:
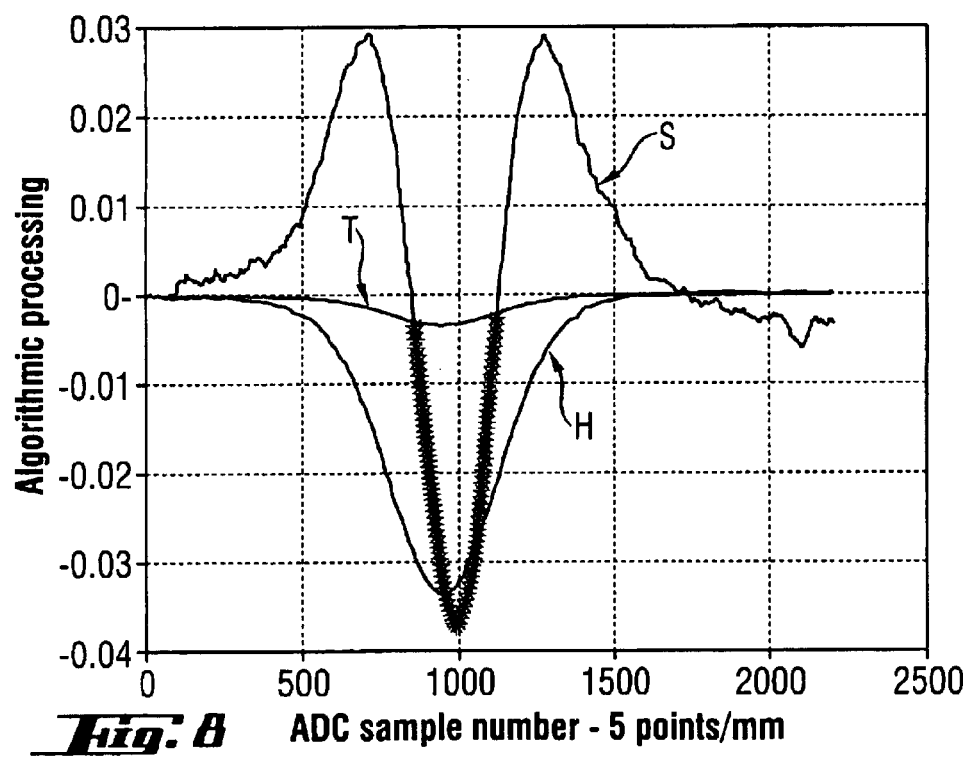
FIG. 8 shows overlaid traces for an algorithmic signal processing, according to the invention, whereby trace S represents the sum of the three sense coil signals shown individually in FIG. 6; trace H represents the sum of the sixth sense coil signals shown individually in FIG. 7, and trace T represents one example of a preferred detection threshold curve.

The three signal traces shown in FIG. 8 are Trace S, Trace H and Trace T, wherein:

Trace S is the sum of the three S-curves displayed in FIG. 6;

Trace H is the sum of the six H-curves displayed in FIG. 7; and

Trace T is the processed threshold obtained from trace H and multiplied by a defined factor, as explained below.

The simple and easy to implement algorithm described herein is used for finding the ferromagnetic object (rebar R) in three steps, as follows:

1. Add the three S-curves (FIG. 6) together. The new shape or curve is the summarized S-curve S in FIG. 8. The minimum, i.e. the lowest point, of this S-curve is the position of the rebar's center.

2. Add the six H-curves (FIG. 7) together. The new shape is the H-curve in FIG. 8. At each sample multiply curve H by a weighting factor a within a range of $-2<\alpha+2$, and typically and not limited to $\alpha=0.1$. The new shape or curve is the "Threshold-curve" T in FIG. 8.

3. Compare the level of the S-curve against the T-curve. If the S-curve is more negative than the T-curve then a rebar R is deemed to be detected.

FIG. 8 shows the S-, H- and T-curves. While the S-curve is more negative than the T-curve a rebar R is below the sensor assembly.

Where no rebar R is present or the rebar R is too far away from the sensor assembly, the nine basic signals are lost in the system noise and there is no detectable shape.

FIG. 9 is a flow diagram of a measuring and signal processing routine. There are four basic time periods in the rebar detection process, as follows:

In the first time period T1, field coil 1A is excited and field coils 1B, 1C are in the passive state. During this time period T1, the sense coil voltages 2A, 2B, 2C are measured and held in a temporary store.

In the second time period T2, field coil 1B is excited and field coils 1A, 1C are in the passive state. During this time period T2, the sense coil voltages at 2A, 2B, 2C are measured and held in a temporary store.

In the third time period T3, field coil 1C is excited and field coils 1A, 1B are in the passive state. During this time period T3, the sense coil voltages at 2A, 2B, 2C are measured and held in a temporary store.

In the fourth time period T4, the sum of the S-curves and the sum of the H-curves are computed digital and analog and the ratio of the two resulting signals is compared to decide whether or not a rebar R is in the proximity of the sensor assembly. This measuring and signal processing cycle repeats endlessly.

What is claimed is:

1. An inductive sensor arrangement for detecting one of a ferromagnetic and non-ferrous electrically conducting object buried in a surrounding medium comprising three field coils for generating a penetrating alternating magnetic flux in said medium and three sense coils for sensing magnetic flux field disturbances caused by one of said ferromagnetic and non-ferrous electrically conducting object, wherein the sensor arrangement comprises three field coils (1A, 1B, 1C) arranged in a geometric plane and adjacently positioned at defined angular distances from each other in relation to and around a central axis orthogonal to said plane, and three sense coils (2A, 2B, 2C) cooperating with said three field coils to form three field/sense coil pairs, wherein each of said three sense coils is mounted inside a respective one of said three field coils in an orientation to the axis of the respective one of said three field coils such that almost no voltage is induced in each of the sense coils from the respective one of said three field coils in an environment free of one of the ferromagnetic and the non-ferrous electrically conducting object.

2. The inductive sensor arrangement of claim 1, wherein said three field/sense coil pairs are positioned at equal angular distances of 120° from each other.

3. The inductive sensor arrangement of claim 1, wherein the axes of each of said sense coils (2A, 2B, 2C) are respectively arranged orthogonally with respect to the axes of each of the respectively associated field coil.

4. A method for detecting one of a ferromagnetic and non-ferrous electrically conducting object hidden in a surrounding medium by an inductive sensor arrangement comprising three field coils (1A, 1B, 1C) adjacently positioned at defined angular distances from each other around a central axis and three sense coils (2A, 2B, 2C), wherein each of said three sense coils is mounted inside a respective one of said three field coils in an orientation to the axis of the respectively associated field coil such that almost no voltage is induced in each of the sense coils from said respectively associated field coil in an environment free of one of the ferromagnetic and the non-ferrous electrically conducting object, the method comprising the steps of:

sequentially and individually applying defined current ramps to each of the three field coils to excite each of the three field coils by producing a changing magnetic flux penetrating said medium from three different physical positions;

collecting nine distinct output voltages from the three sense coils, comprising the steps of collecting a first output voltage from a first sense coil (2A) and second and third output voltages from the remaining second and third sense coils (2B, 2C), while the first field coil (1A) is excited by a first defined current ramp;

collecting a fourth output voltage from the second sense coil (2B) and fifth and sixth voltages from the remaining first and third sense coils while the second field coil (1B) is excited by a second defined current ramp;

collecting a seventh output voltage from the third sense coil (2C) and eighth and ninth voltages from the remaining first and second sense coils while the third field coil (1C) is excited by a third defined current ramp; and processing the nine distinct output voltages using an algorithm for determining whether one of a ferromagnetic object (R) and an electrically conducting object is present.

5. The method of claim 4, further comprising the step of temporarily storing the values of all nine output voltages, wherein the first, second and third voltages measured during a first time period while the first field coil (1A) is excited are stored temporarily in associated first, second and third storage areas, the fourth, fifth and sixth voltages measured during a second time period while the second field coil (1B) is excited are held temporarily in associated fourth, fifth and sixth storage areas, and the seventh, eighth and ninth voltages measured during a third time period while the third field coil (1C) is excited are held temporarily in associated seventh, eighth and ninth storage areas.

6. The method of claim 5, wherein an algorithmic processing of said nine distinct temporarily stored output voltages comprises the step of adding the first, fourth and seventh output voltages to generate an Add-curve (S);

adding the second and third, the fifth and sixth, and the eighth and ninth output voltages to produce a combined HUMP-curve (H);

multiplying the combined HUMP-curve for each sample by a distinct weighting factor selected from a range of $-2<\alpha<+2$ to generate a threshold curve (T);

comparing the level of the Add-curve (S) against the level of the Threshold-curve (T), and deciding whether a "ferromagnetic object present" if the Add-curve values is more negative than the Threshold-curve value and whether an "electrically conducting object present" if the Add-curve value is more positive than the Threshold-curve value.

7. The method of claim 6, wherein said weighting factor for defining said Threshold-curve is selected from a range of $-0.5<\alpha<\_+0.5$.

8. The method of claim 6, wherein said weighting factor for defining said Threshold-curve is selected from a range of $-0.2<\alpha<\_+0.4$.

* * * * *